US012732352B2

(12) United States Patent
Sarrazin et al.

(10) Patent No.: US 12,732,352 B2
(45) Date of Patent: Sep. 8, 2026

(54) SINGLE STAGE MULTIPLY-ACCUMULATE (MAC) BUTTERFLY MULTIPLIER CIRCUIT FOR NUMBER THEORIC TRANSFORMS

(71) Applicant: QUALCOMM Incorporated, San Diego, CA (US)

(72) Inventors: Yann Sarrazin, Opio (FR); Gustavo Souza Banegas, Antibes (FR)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 19/046,409

(22) Filed: Feb. 5, 2025

(65) Prior Publication Data

US 2026/0230311 A1 Aug. 6, 2026

(51) Int. Cl.
*H04L 9/08* (2006.01)
*H04L 9/32* (2006.01)

(52) U.S. Cl.
CPC .......... *H04L 9/0852* (2013.01); *H04L 9/0861* (2013.01); *H04L 9/3247* (2013.01)

(58) Field of Classification Search
CPC .... H04L 9/0852; H04L 9/0861; H04L 9/3247
See application file for complete search history.

(56) References Cited

U.S. PATENT DOCUMENTS

| | | | | |
|---|---|---|---|---|
| 10,644,877 | B2 * | 5/2020 | Khedr | H04L 9/008 |
| 12,323,507 | B2 * | 6/2025 | Park | H04L 9/008 |
| 12,531,723 | B2 * | 1/2026 | Bisheh Niasar | H04L 9/0852 |
| 12,580,729 | B2 * | 3/2026 | Park | H04L 9/008 |
| 2024/0220249 | A1 * | 7/2024 | Chen | G06F 30/343 |
| 2026/0037218 | A1 * | 2/2026 | Bisheh Niasar | G06F 7/523 |
| 2026/0073081 | A1 * | 3/2026 | Bisheh Niasar | G06F 21/75 |
| 2026/0121834 | A1 * | 4/2026 | Patel | H04L 9/0631 |

* cited by examiner

*Primary Examiner* — Viral S Lakhia
(74) *Attorney, Agent, or Firm* — Polsinelli LLP

(57) ABSTRACT

Disclosed are systems, apparatuses, processes, and computer-readable media for sharing encrypted entropy. For example, a method includes determining a plurality of second coefficients from a plurality of first coefficients in association with a Numeric Theoric Transform (NTT), wherein each second coefficient of the plurality of second coefficients is generated based on a corresponding first coefficient of the plurality of first coefficients using a shared stage multiplier circuit; and generating an encryption key based on the plurality of second coefficients.

20 Claims, 10 Drawing Sheets

First Device 102

Second Device 104

Generate Public Key And Secret Key 106

Public Key 108

Generate Random Secret Key Based On Public Key And Generate Ciphertext Based On The Secret Key 110

Encapsulate Message 112

Encapsulated Message 114

Derive Ciphertext From Secret Key And Derive The Random Secret Key 116

Decapsulate Message Based On The Random Secret Key 118

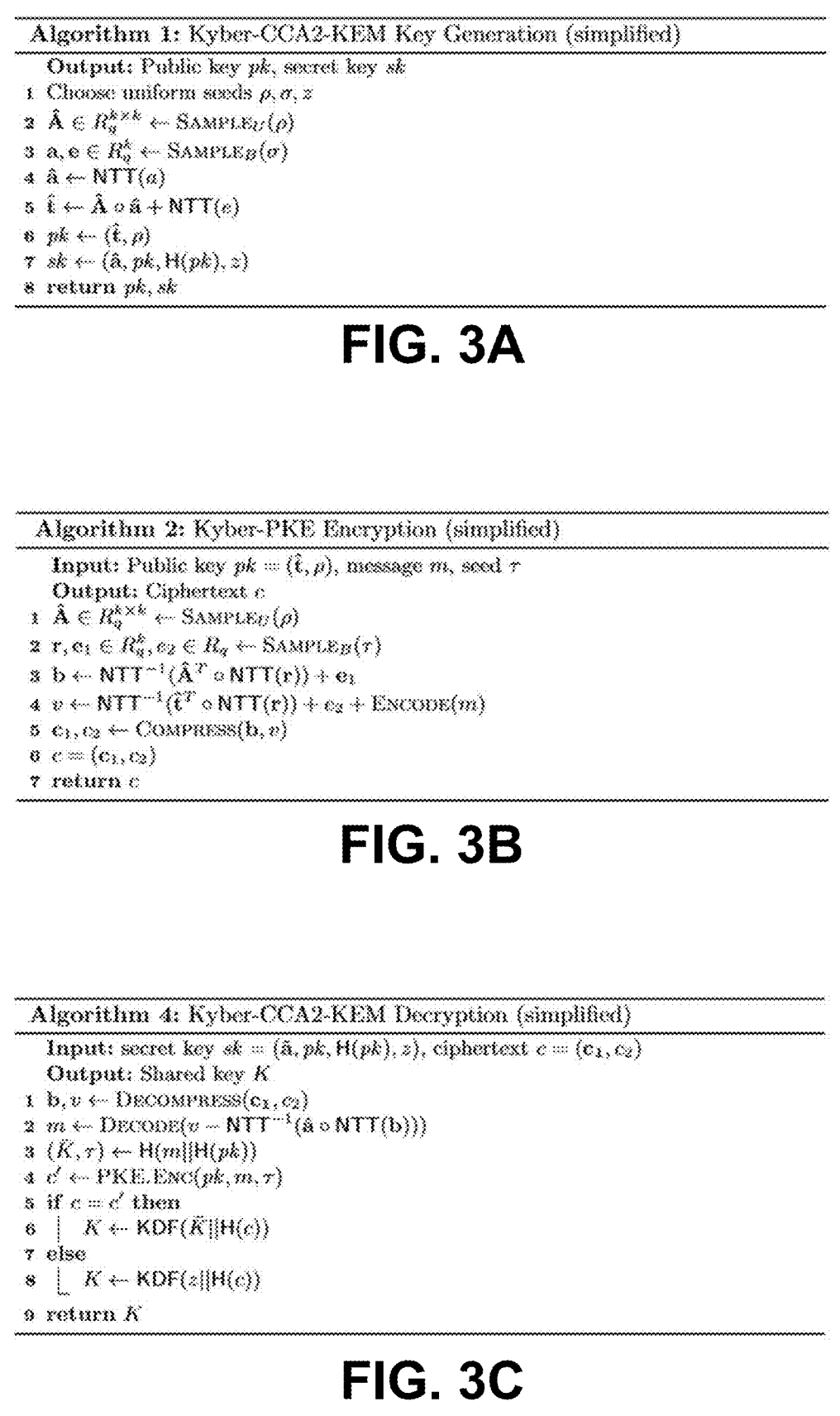

Algorithm 1: Kyber-CCA2-KEM Key Generation (simplified)

Output: Public key $pk$, secret key $sk$

Choose uniform seeds $\rho, \sigma, z$ $\hat{\mathbf{A}} \in R_q^{k \times k} \leftarrow \textsc{Sample}_U(\rho)$ $\mathbf{a}, \mathbf{e} \in R_q^k \leftarrow \textsc{Sample}_B(\sigma)$ $\hat{\mathbf{a}} \leftarrow \mathsf{NTT}(a)$ $\hat{\mathbf{t}} \leftarrow \hat{\mathbf{A}} \circ \hat{\mathbf{a}} + \mathsf{NTT}(e)$ $pk \leftarrow (\hat{\mathbf{t}}, \rho)$ $sk \leftarrow (\hat{\mathbf{a}}, pk, \mathsf{H}(pk), z)$ return $pk, sk$

FIG. 3A

Algorithm 2: Kyber-PKE Encryption (simplified)

Input: Public key $pk = (\hat{\mathbf{t}}, \rho)$, message $m$, seed $\tau$

Output: Ciphertext $c$ $\hat{\mathbf{A}} \in R_q^{k \times k} \leftarrow \textsc{Sample}_U(\rho)$ $\mathbf{r}, \mathbf{e}_1 \in R_q^k, e_2 \in R_q \leftarrow \textsc{Sample}_B(\tau)$ $\mathbf{b} \leftarrow \mathsf{NTT}^{-1}(\hat{\mathbf{A}}^T \circ \mathsf{NTT}(\mathbf{r})) + \mathbf{e}_1$ $v \leftarrow \mathsf{NTT}^{-1}(\hat{\mathbf{t}}^T \circ \mathsf{NTT}(\mathbf{r})) + e_2 + \textsc{Encode}(m)$ $\mathbf{c}_1, c_2 \leftarrow \textsc{Compress}(\mathbf{b}, v)$ $c = (\mathbf{c}_1, c_2)$ return $c$

FIG. 3B

Algorithm 4: Kyber-CCA2-KEM Decryption (simplified)

Input: secret key $sk = (\hat{\mathbf{a}}, pk, \mathsf{H}(pk), z)$, ciphertext $c = (\mathbf{c}_1, c_2)$

Output: Shared key $K$ $\mathbf{b}, v \leftarrow \textsc{Decompress}(\mathbf{c}_1, c_2)$ $m \leftarrow \textsc{Decode}(v - \mathsf{NTT}^{-1}(\hat{\mathbf{a}} \circ \mathsf{NTT}(\mathbf{b})))$ $(\bar{K}, \tau) \leftarrow \mathsf{H}(m \| \mathsf{H}(pk))$ $c' \leftarrow \mathsf{PKE.Enc}(pk, m, \tau)$ if $c = c'$ then

$K \leftarrow \mathsf{KDF}(\bar{K} \| \mathsf{H}(c))$ else

$K \leftarrow \mathsf{KDF}(z \| \mathsf{H}(c))$ return $K$

Load

Store

Store

Store $a_0$ $a_1$ $a_2$ $a_3$ $a_4$ $a_5$ $a_6$ $a_7$ $b_0$ $b_1$ $b_2$ $b_3$ $b_4$ $b_5$ $b_6$ $b_7$ $\omega^3$ $\omega^2$ $\omega^1$ $\omega^1$ First Stage 404

$\omega^2$ $\omega^2$ $\omega^2$ $\omega^2$

Second Stage 406

$\omega^3$ $\omega^3$ $\omega^3$ $\omega^3$

Third Stage 408

SINGLE STAGE MULTIPLY-ACCUMULATE (MAC) BUTTERFLY MULTIPLIER CIRCUIT FOR NUMBER THEORIC TRANSFORMS

FIELD

The present disclosure generally relates to key encapsulation for post-quantum cryptography. For example, aspects of the present disclosure relate to a single stage multiply accumulate (MAC) butterfly multiplier circuit for Number Theoric Transforms.

BACKGROUND

Computing devices often employ various techniques to protect data. As an example, data may be subjected to encryption and decryption techniques in a variety of scenarios, such as writing data to a storage device, reading data from a storage device, writing data to or reading data from a memory device, encrypting and decrypting blocks and/or volumes of data, encrypting and decrypting digital content, performing inline cryptographic operations, etc. Such encryption and decryption operations are often performed, at least in part, using a security information asset, such as a cryptographic key, a derived cryptographic key, etc. Certain scenarios exist in which attacks are performed in an attempt to obtain such security information assets. Accordingly, it is often advantageous to implement systems and techniques to protect such security information assets.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, computer readable medium, and circuits for computing Number Theoric Transforms (NTT) using a butterfly multiply-accumulate (MAC) circuit. In some aspects, a method includes: determining a plurality of second coefficients from a plurality of first coefficients in association with a Numeric Theoric Transform (NTT), wherein each second coefficient of the plurality of second coefficients is generated based on a corresponding first coefficient of the plurality of first coefficients using a shared stage multiplier circuit; and generating an encryption key based on the plurality of second coefficients.

In some aspects, an apparatus for Number Theoric Transform (NTT) computations is provided that includes a butterfly multiply-accumulate (MAC) circuit for calculating output coefficients based on input coefficients and a polynomial value; and a multiplexer for selecting the input coefficients and the polynomial value to input into the butterfly MAC circuit based on a computation stage of an NTT computation, wherein the butterfly MAC circuit is configured to output point-wise coefficients for the NTT computation based on the computation stage.

In some aspects, an apparatus is provided that includes: means for determining a plurality of second coefficients from a plurality of first coefficients in association with a Numeric Theoric Transform (NTT), wherein each second coefficient of the plurality of second coefficients is generated based on a corresponding first coefficient of the plurality of first coefficients using a shared stage multiplier circuit; and means for generating an encryption key based on the plurality of second coefficients.

In some aspects, a non-transitory computer-readable medium is provided having stored thereon instructions that, when executed by at least one processor, cause the at least one processor to: determine a plurality of second coefficients from a plurality of first coefficients in association with a Numeric Theoric Transform (NTT), wherein each second coefficient of the plurality of second coefficients is generated based on a corresponding first coefficient of the plurality of first coefficients using a shared stage multiplier circuit; and generate an encryption key based on the plurality of second coefficients.

In some aspects, one or more of the apparatuses described herein is, is a part of, or includes a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Illustrative aspects of the present application are described in detail below with reference to the following figures:

FIGS. 3A, 3B, and 3C illustrate pseudocode associated with various PQC algorithms, in accordance with some aspects of the disclosure.

DETAILED DESCRIPTION

Figure 1:
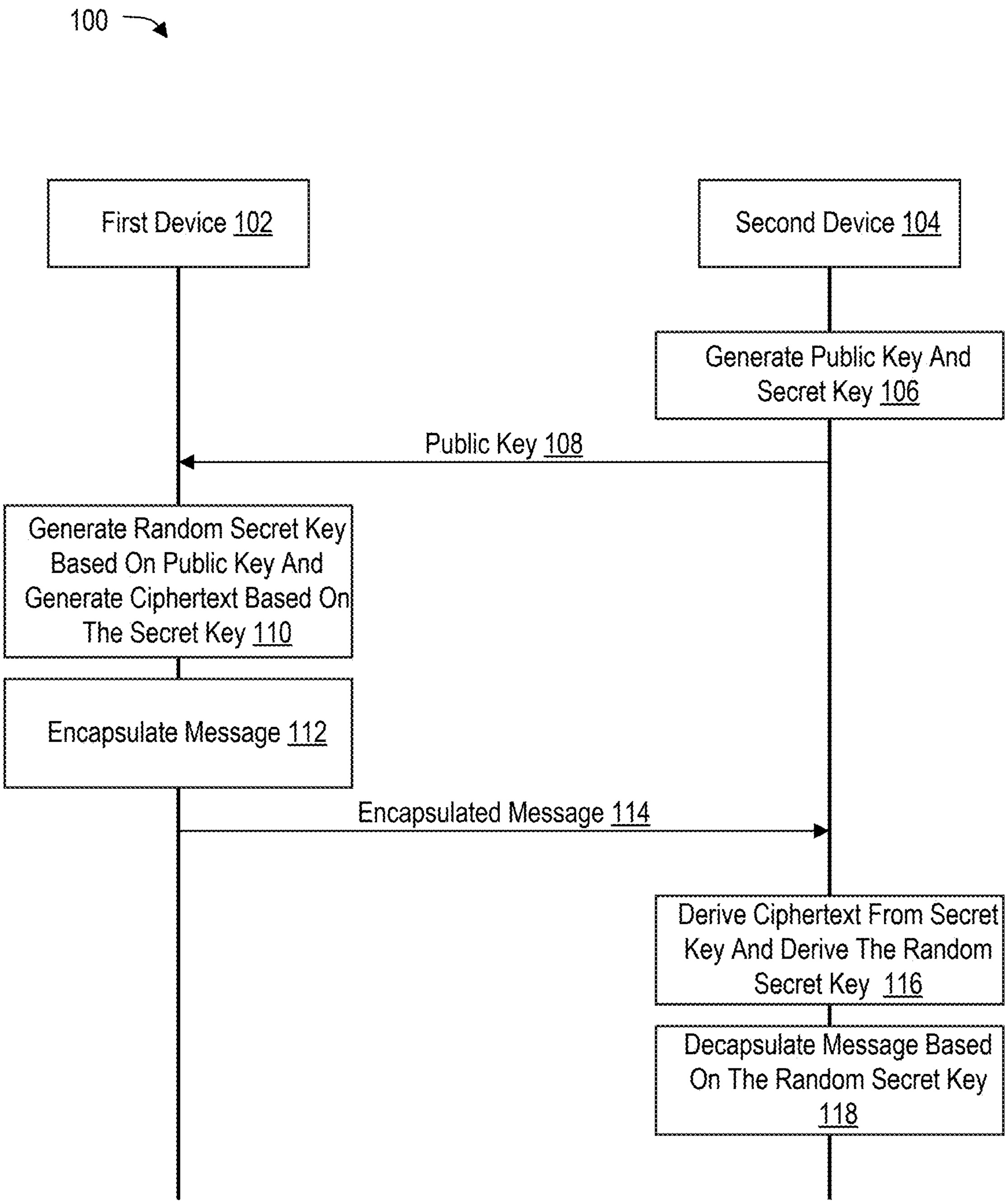
FIG. 1 is a sequence diagram illustrating a process 100 of exchanging encapsulated information using a key encapsulation mechanism (KEM), in accordance with some aspects of the disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

As previously mentioned, computing devices often employ various techniques to protect data. As an example, data may be subjected to encryption and decryption techniques in a variety of scenarios, such as writing data to a storage device, reading data from a storage device, writing data to or reading data from a memory device, encrypting and decrypting blocks and/or volumes of data, encrypting and decrypting digital content, performing inline cryptographic operations, etc. Encryption and decryption operations are often performed, at least in part, using a security information asset, such as a cryptographic key, a derived cryptographic key, etc.

Conventional encryption techniques, such as RSA and ECC, rely on mathematical problems such as factoring large numbers or solving discrete logarithms to ensure that the signatures cannot feasibly be decrypted in a limited period (e.g., weeks) with limited resources. However, quantum computers could solve efficiently these mathematical problems in conventional encryption techniques using algorithms like Shor's algorithm. When large-scale quantum computers become available, quantum computing processing techniques will break these classical conventional encryption techniques, rendering current public-key infrastructures insecure.

Post-Quantum Cryptography (PQC) is based on quantum-resistant mathematical foundations like lattice-based or hash-based cryptography and can provide the necessary security to protect data against quantum attacks. Transitioning to PQC ensures that sensitive information, including financial transactions and critical infrastructure communications, remains secure both now and in the future, even as quantum computing capabilities advance.

The National Institute of Standards and Technology (NIST) PQC Project is in the process of soliciting, evaluating, and standardizing quantum-resistant public-key cryptographic algorithms. A goal of the NIST Post-Quantum Cryptography Project is to provide new public-key cryptography standards that will specify one or more additional unclassified, publicly disclosed digital signatures, public-key encryption, and key-establishment algorithms that are available worldwide and are capable of protecting sensitive government and commercial information well into the foreseeable future, including after the advent of quantum computers. Non-limiting examples of PQC digital signature schemes include but are not limited to, the Dilithium signature scheme, the Racoon signature scheme, the Kyber key encapsulation mechanism (KEM) and the Provable Unbalanced Oil and Vinegar (PROV) signature scheme.

The PQC digital signature schemes use Number Theoric Transform (NTT) computations for fast and efficient polynomial multiplication, which key component of lattice-based cryptographic schemes. The NTT is a discrete transform that can be used to multiply polynomials with integer coefficients in an efficient manner. For example, the NTT can operate over finite fields or rings of integers modulo a prime (e.g., instead of complex numbers). The NTT can be useful for cryptographic algorithms. In PQC, polynomials represent key components such as public keys, ciphertexts, and shared secrets, and their multiplication often involves high-dimensional data. Directly multiplying these polynomials in the time domain is computationally expensive, with a complexity of $O(n^2)$. The NTT accelerates this by transforming polynomials into the frequency domain, where multiplication becomes pointwise and much faster, reducing complexity to $O(n*\log(n))$. Additionally, the NTT operates over modular reduction of prime numbers and ensures compatibility with the finite fields or rings used in PQC.

NTT computations consume significant clock cycles in software implementations due to numerous modular additions, subtractions, and multiplications, which are often performed on high-dimensional polynomials. Each coefficient of the polynomial is transformed and uses computationally intensive iterative butterfly operations and modular reductions. Butterfly operations are computational steps in algorithms where input pairs are combined through addition and subtraction in a crisscrossing pattern to efficiently compute transformations. The use of modular arithmetic also introduces overhead because operations such as division for modular reduction are slower than standard arithmetic. In one aspect, Booth radix4 multiplication with modulo can be used by the systems and techniques described herein. The high computational demand poses a problem for real-time or resource-constrained environments, such as Internet of Things (IoT) devices or embedded systems, where energy efficiency and processing time are critical. The heavy clock cycle usage can also limit the throughput of cryptographic operations and impact the performance of post-quantum encryption schemes in scenarios requiring rapid key exchanges or high volumes of encrypted data.

In one or more aspects, systems, apparatuses, processes (also referred to as methods), and computer-readable media (collectively referred to herein as "systems and techniques") are described herein for NTT computations using a multiply-accumulate (MAC) butterfly multiplier circuit. A butterfly MAC circuit (e.g., a butterfly MAC unit) is a hardware component that performs multiplication using a cross-coupled MAC circuit (or MAC unit) and adds the result to an accumulator in a single step. A MAC circuit can perform a single multiplication followed by an addition generally for linear operations, and the butterfly MAC circuit can combine multiple MAC operations in a butterfly pattern to handle both addition and subtraction of multiplied inputs for transform-based algorithms. In some aspects, a shared stage multiplier is disclosed and includes a butterfly MAC circuit. The shared stage multiplier is configured to iteratively perform calculations for an NTT that is conventionally performed with a pipeline of horizontal and vertical butterfly multipliers for an iterative point-wise coefficient calculation. In this case, the shared stage can reduce store and load operations between iterations of a complex iterative computation. The point-wise coefficients that are output by the shared stage multiplier are used in point-wise multiplications to generate keys with lattice structures that are resistant to quantum computing-based attacks. Point-wise coefficients refer to individual values obtained by directly applying an operation, such as multiplication or addition using a butterfly MAC circuit, to corresponding elements of two sequences In some aspects, a method is disclosed for performing a post quantum cryptography function. The method includes determining a plurality of second coefficients from the plurality of first coefficients in connection with a Numeric Theoric Transform (NTT). In some aspects, each corresponding second coefficient is generated based on a corresponding first coefficient using a shared stage multiplier circuit. The shared stage multiplier circuit includes a butterfly MAC circuit as described above. After generating the plurality of second coefficients, the method includes generating an encryption key based on the plurality of second coefficients. The encryption key can be for encrypting content or decrypting content.

In some aspects, a disclosed shared stage multiplier circuit including a butterfly MAC circuit is shared between the different stages of an NTT computations and parallelizes the operations. In some cases, symmetry may exist among the coefficients, in which case a subset of all coefficients (e.g., half of the coefficients) may be calculated, with the remaining coefficients generated by mirroring (e.g., the conjugate) and joining the mirrored coefficients with the calculated coefficients. In some aspects, the shared stage multiplier circuit does not need to load/store between registers and thereby reduces the number of operations to perform the NTT. The disclosed shared stage multiplier circuit reduces the amount of circuitry required to perform NTT computations, reduces the power required and increases the speed of the NTT computations. A significant bottleneck of PQC is removed, which can increase usage of PCQ functionality and further include devices that were conventionally unable to implement due to limited processing.

FIG. 1 is a sequence diagram 100 illustrating a process of exchanging encapsulated information using a KEM in accordance with some aspects of the disclosure. In this case, a first device 102 is configured to transmit an encapsulated message to a second device 104, and may encapsulate the information using Kyber.

In some aspects, the second device 104 is configured to generate a public key and a corresponding secret key at block 106. The second device 104 is configured to transmit a message including the public key 108, and the second device 104 securely stores the secret key. In some aspects, the lattice-based cryptography used by Kyber ensures that the public key and the secret key are resilient to quantum and classical attacks by leveraging structured lattices to provide security and efficiency.

When the first device 102 is configured to transmit a message, the first device 102 first generates a random secret key based on the public key and then generates a corresponding ciphertext based on the random secret key at block 110. For example, the first device 102 may use a deterministic algorithm to generate the random secret key based on the public key. In some aspects, the ciphertext contains the encapsulated shared secret and is resistant to both classical and quantum attacks because it is because it is constructed using lattice-based encryption in Kyber. After generating the ciphertext, at block 112, the first device 102 is configured to generate an encapsulated message 114 by encrypting the message using the random secret key. The encapsulated message 114 also includes the ciphertext generated by the first device 102. The first device 102 transmits the encapsulated message 114 to the second device 104.

The second device 104 receives the encapsulated message 114 and derives the random secret key from the ciphertext based on its stored secret key at block 116. In some aspects, the shared secret is generated deterministically based on the public key and randomness and the second device 104 can derive the same shared secret based on the ciphertext and its stored secret key. After generating the random secret key, the second device 104 decapsulates the encapsulated message 114 and decrypts the message based on the random secret key at block 118.

In some aspects, Kyber is referred to as a KEM to securely derive a shared secret key between the sender and the recipient, and the shared secret key is then used for encrypting and decrypting the actual message with a symmetric encryption algorithm. The ciphertext is essentially the encapsulated version of the shared secret and is securely transmitted to the recipient. Since the shared secret is generated deterministically based on the public key and randomness, the encapsulation process guarantees that both the sender and recipient can derive the same shared secret. In some aspects, the secret key stored at the second device 104 is necessary to recover the shared random secret.

Figure 2:
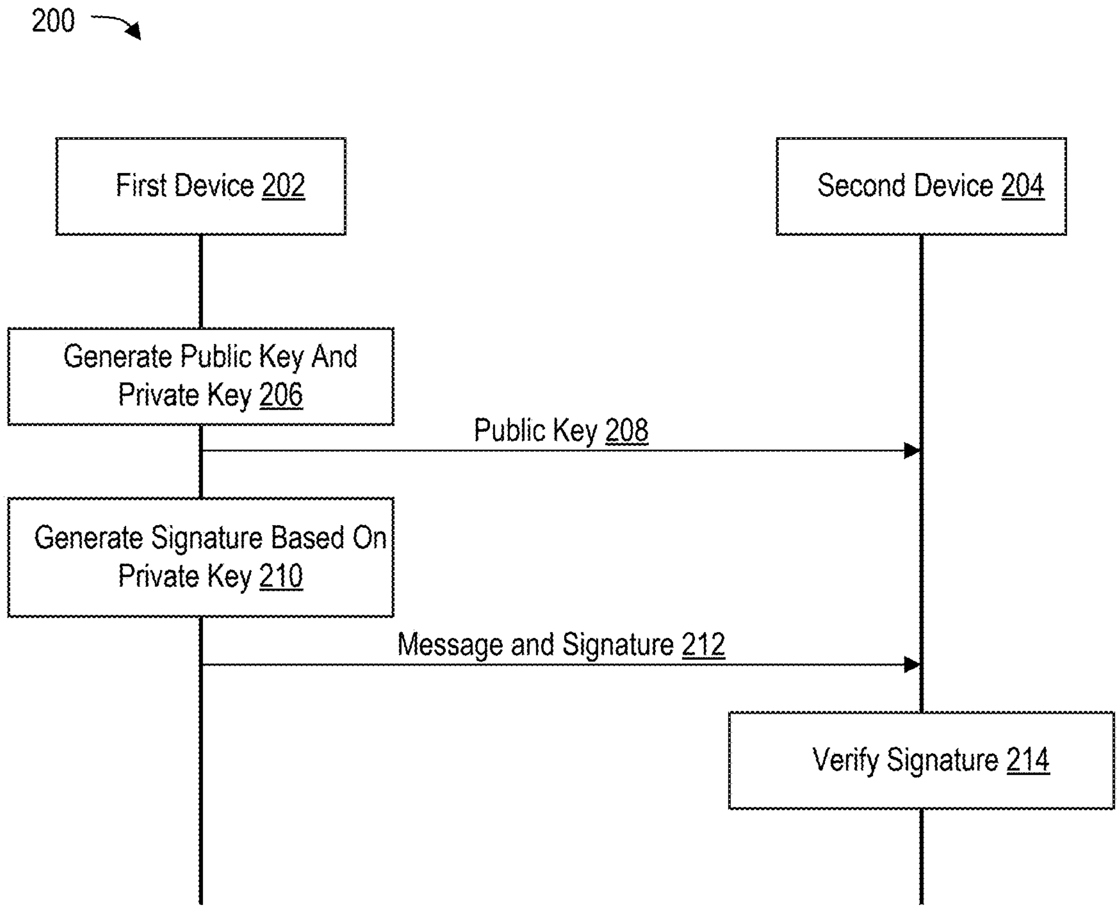
FIG. 2 is a sequence diagram illustrating a process of validating information using a Post-Quantum Cryptography (PQC) signature, in accordance with some aspects of the disclosure.

FIG. 2 is a sequence diagram 200 illustrating a process of validating information using a PQC signature in accordance with some aspects of the disclosure. In this case, a first device 102 is configured to transmit a message to a second device 104 and the second device 104 will validate the message based on lattice computations. For example, the second device 104 can use the signature generated based on Dilithium or another PQC process to validate the information retrieved from a party (e.g., firmware update, etc.).

The first device 202 is configured to generate a private key and a public key at block 206 and then distributes the public key 208 to other devices, such as the second device 204. When the first device 202 is configured to provide authenticity, for example, to prove a file retrieved from the first device 202 is authentic, the first device 202 may generate a signature based on the private key at block 210. In one aspect, the first device 202 computes a signature that satisfies certain lattice constraints while maintaining a small size to ensure security. The first device 202 then transmits a message 212 with the signature. The second device 204 receives the message 212 and uses the public key at block 214 to verify or check that the signature satisfies the lattice-based equations without requiring access to the private key. As described further below, each of these processes implements multiple NTT computations.

FIGS. 3A, 3B, and 3C illustrate pseudocode associated with various PQC algorithms in accordance with some aspects of the disclosure. In some aspects, FIG. 3A illustrates a simplified version of a process to generate a random secret key used in Kyber, FIG. 3B illustrates a simplified version of a process to perform Kyber public key encryption (PKE), and FIG. 3C illustrates a simplified version of a process to perform Kyber KEM decryption.

In each algorithm illustrated in FIGS. 3A, 3B, and 3C, NTT or inverse-NTT is implemented multiple times. In some aspects, the NTT is a discrete analog of the Fourier Transform over finite fields or rings. NTT is similar to discrete Fourier transforms and evaluates polynomial multiplication and expressions. For example, NTT maps polynomials into the frequency domain, enables pointwise multiplication of polynomial coefficients, and reduces the computational complexity of polynomial multiplication from $O(n^2)$ to $O(n*\log(n))$. In some aspects, NTT evaluates polynomial expressions at specific points (e.g., roots of unity in the underlying modular field) to ensure modular arithmetic that prevents data overflow and maintains security. Quantum systems are unable to perform polynomial evaluation at scale because the underlying hardness stems from structured lattice problems such as learning with errors (LWE). Structured lattice problems are computationally hard and resilient to quantum attacks because the mathematical properties of latices require finding hidden structures in high-dimensional spaces, which quantum algorithms cannot efficiently exploit.

Figure 4:
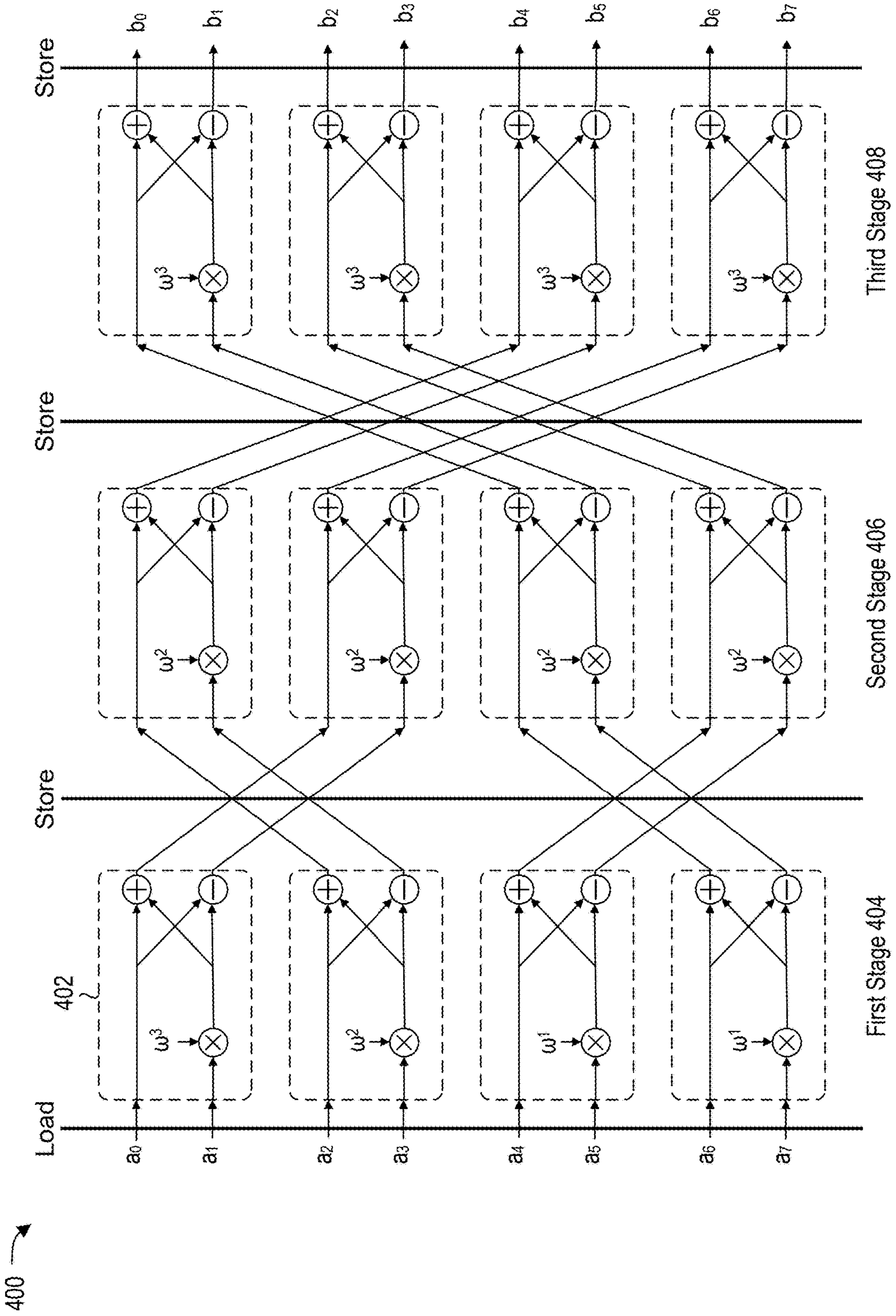
FIG. 4 illustrates a conceptual illustration of a multiplier architecture for a coefficient generation process used in a Number Theoric Transform (NTT) computation for PQC algorithms, in accordance with some aspects of the disclosure.

FIG. 4 illustrates a conceptual illustration of a multiplier architecture 400 for solving 8 coefficients of a coefficient generation process used in an NTT computation. Although only 8 coefficients are illustrated, an NTT computation uses more coefficients depending on the implementation (e.g., 256 coefficients).

In some aspects, the multiplier architecture 400 includes a plurality of multiplier 402, and only a single multiplier is labeled to simplify explanation. In particular, the multiplier 402 may implement the Butterfly Booth Radix4 Multiplier and uses two values and a polynomial value ω to perform a corresponding multiplication across three stages.

In the first stage 404, the first coefficients $a_0$ to $a_7$ are input into corresponding multipliers, and a first polynomial $\omega^1$ is applied to each coefficient followed by a corresponding addition or subtraction. For example, in the multiplier 402, values $a_0$ and $a_1$ are input, and the multiplier 402 multiplies each value by $\omega_1$ and adds or subtracts the multiplied values to generate output values $a0+w^1*a1$ and $a1-\omega^1*a_0$. In some aspects, the values must be loaded into memory before the first stage 404, and then each result value must also be stored between subsequent stages.

In the second stage 406, the values generated in the first stage 404 are provided to another multiplier and then multiplied based on a second polynomial $\omega^2$, then stored before the third stage 408. In the third stage 408, the values from the second stage 406 are then multiped by the third polynomials $\omega^3$. After the third stage, the multiplier architecture 400 outputs the second coefficients b0 to b7 that are used by an NTT computation to perform a point-wise multiplication for generating a key (e.g. a random secret key) used in a PQC. In some aspects, three different stages are used to perform overall computation of the 8 coefficient (a0-a8 to b0-b8) in PQC such as Dilithium and Kyber.

In some aspects, the NTT is computationally expensive, consumes a non-trivial amount of processing power in software, and is a bottleneck in PQC functions. For example, Kyber using a Q modular reduction of 12 bits requires 5 NTT computations, and each NTT computation consumes 6855 clock cycles. In another example, Dilithium with a Q modular reduction of 23 bits requires 5 NTT computations, and each NTT computations requires 8,540 clock cycles.

Figure 5:
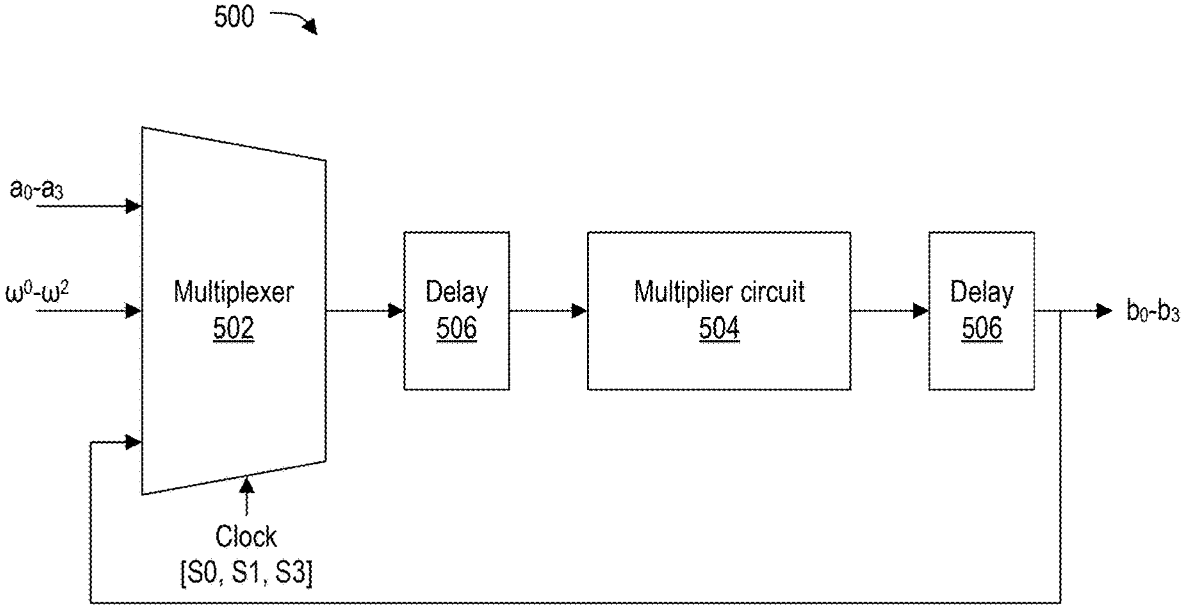
FIG. 5 is a block diagram illustrating a shared stage multiplier to reduce computation time and complexity of an NTT algorithm in accordance with some aspects of the disclosure.

FIG. 5 is a block diagram illustrating a shared stage multiplier 500 to reduce computation time and complexity of an NTT algorithm in accordance with some aspects of the disclosure. In one aspect, the shared stage multiplier 500 is configured to execute a plurality of stages using a new architecture.

In some aspects, the shared stage multiplier 500 includes a multiplexer 502 that is configured to select and provide inputs to a multiplier circuit 504. In one example, the shared stage multiplier 500 is configured to receive a plurality of coefficients (e.g., $a_0$-$a_3$) and polynomials (e.g., $\omega^0$-$\omega^2$). The shared stage multiplier 500 also includes a feedback loop from the multiplier circuit 504 to the multiplexer 502 to feedback multiplication results of a particular stage.

In some aspects, the multiplier circuit 504 may include a multiply-accumulate (MAC) circuit to parallelize operation. For example, the multiplier circuit 504 may be implemented by a butterfly MAC circuit which integrates a modulo into a partial multiplier for generating partial products, and the MAC circuit solves the partial products of multiple coefficients in parallel. An example butterfly MAC circuit is further described below.

The shared stage multiplier 500 may also include one or more delays 506 to time inputs and outputs from the multiplexer 502 and the multiplier circuit 504. For example, the delays 506 can be a D-type flip flop to keep all combinational logic and circuits synchronized in time.

For example, the multiplexer 502 may receive a clock input that corresponds to a stage implemented by the shared stage multiplier 500 (e.g., the first stage S0, the second stage S1, and the third stage S3). The shared stage multiplier 500 is configured to use resulting products from the multiplier circuit 504 and return the values back to the multiplexer 502, which selects corresponding values such as the polynomial values (e.g., $\omega^0$-$\omega^2$) for the multiplication operation.

In this way, the shared stage multiplier 500 does not need to perform a load or corresponding store operation between computation stages (e.g., the first stage S0, the second stage S1, and the third stage S3). Computation stages are each distinct computation steps in a multi-step process where specific calculations or operations are performed on data as part of a larger algorithm or pipeline. For example, the shared stage multiplier 500 may have three computation stages. The shared stage multiplier 500 comprises a single butterfly MAC circuit that is shared for all computation stage. In some aspects, the shared stage multiplier 500 may also implement shuffling for PQC to randomize or obfuscate data structures (e.g., keys or ciphertexts) to prevent attackers from exploiting patterns or side-channel information. Shuffling is employed to enhance the resistance of lattice-based or code-based cryptography against timing attacks, differential power analysis, and other side-channel vulnerabilities.

The shared stage multiplier 500 is configured to output point-wise coefficients $b_0$-$b_3$ that are used for point-wise multiplication for generating a key (e.g. a random secret key) used in a PQC.

In some aspects, a device can include N/8 shared stage multipliers for generating encryption keys of N bits. In one aspect, the shared stage multiplier can include a MAC unit and compute 2 pairs of point-wise coefficients in parallel (e.g., point-wise coefficients $b_0$-$b_3$) from input coefficients $b_0$-$b_3$. The encryption key may have a symmetrical property, and N/2 point-wise coefficients can be generated from the shared stage multipliers and the remaining N/2 point-wise coefficients can be generated based on the symmetrical property. For example, the remaining N/2 point-wise coefficients can be generated by mirroring the generated N/2 point-wise coefficients.

Figure 6A:
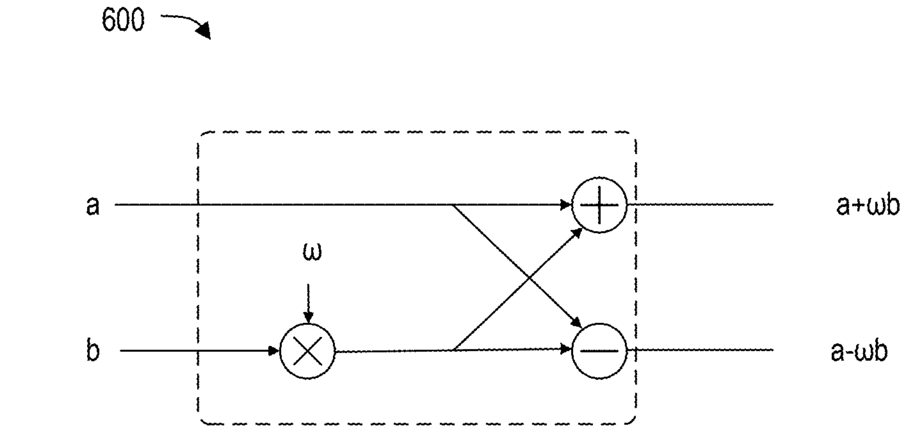
FIG. 6A is a system illustration of a butterfly multiplier used in a conventional NTT algorithm.

FIG. 6A is a system illustration of a butterfly multiplier 600. In some aspects, butterfly multiplication is an important operation in the NTT and combines two inputs to perform modular additions and multiplications efficiently. The "butterfly" structure allows simultaneous computation of two outputs by adding and subtracting the inputs, followed by a modular multiplication with precomputed constants like roots of unity. The butterfly structure optimizes polynomial transformations. For example, the butterfly multiplier 600 multiplies the polynomial value ω based on the b value and then adds or subtracts the resulting product from the a value.

Figure 6B:
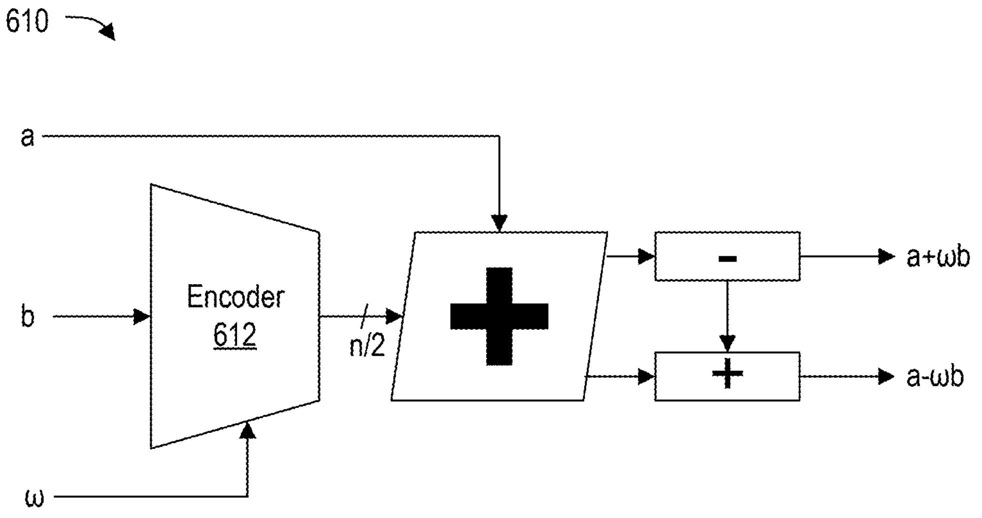
FIG. 6B is a hardware illustration of a butterfly multiplier circuit associated with an NTT to solve a butterfly multiplication, in accordance with some aspects of the disclosure.

FIG. 6B is a hardware illustration of a butterfly multiplier circuit 610 associated with an NTT to solve a butterfly multiplication in accordance with some aspects of the disclosure. In some aspects, the butterfly multiplier circuit 610 includes a modified Booth-Radix 4 architecture to optimize performance. A Booth multiplier to optimize multiplication by recoding one of the operands to reduce the number of partial products generated. Partial products are intermediate products from a decomposed multiplication by separating multiplication into multiple mathematical operations. For example, the Booth multiplier groups bits of the operand (e.g., in pairs for Booth Radix 4 encoding) and encodes the grouped bits to minimize operations such as addition and subtraction.

The butterfly multiplier circuit 610 includes an encoder 612 that decomposes the b values based on the polynomial ω value in n/2 partial products. The butterfly multiplier circuit 610 combines the addition and the subtraction into the partial product. Combining the addition and the subtraction into the partial product reduces the number of operations and increases the calculation speed.

Figure 7A:
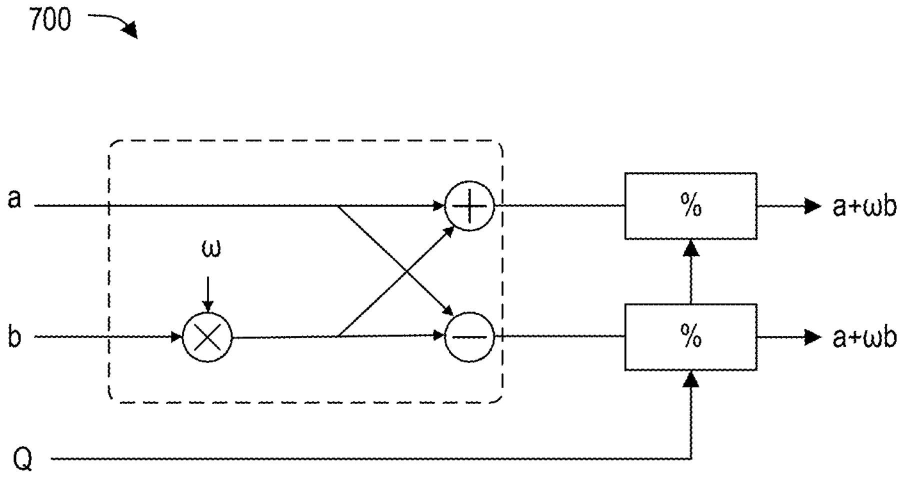
FIG. 7A is a system illustration of a modulo implemented into a butterfly multiplier circuit, in accordance with some aspects of the disclosure.

FIG. 7A is a system illustration of a butterfly multiplier with modulo 700. In some aspects, a modulus operator (or a modulo) is introduced to scale the products and ensure that all intermediate and final results stay within the finite field or ring defined by the modulus Q. Coefficients within NTT can grow large due to additions and multiplications and applying a modulo Q after each arithmetic step maintain the result within the finite field or ring.

Figure 7B:
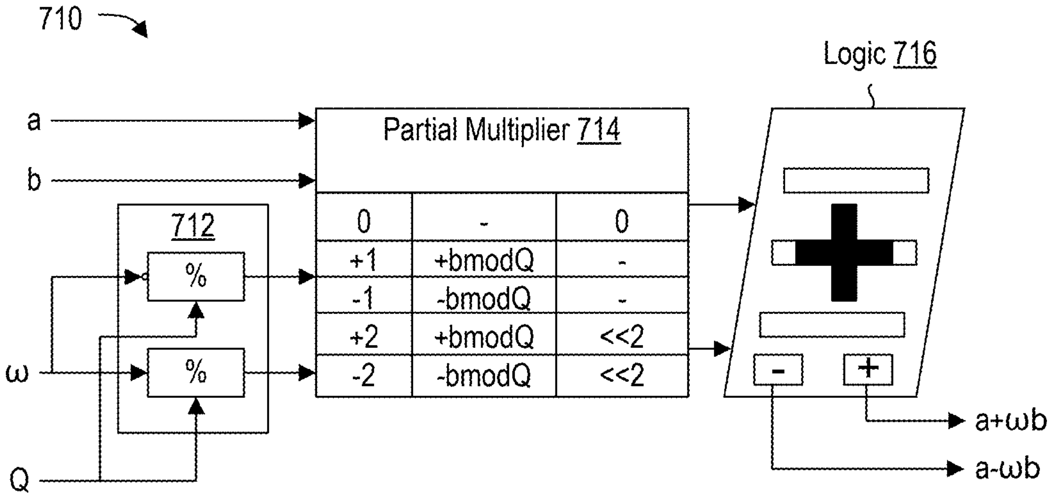
FIG. 7B is a hardware illustration of a modulo implemented into a butterfly multiplier circuit to solve a butterfly multiplication, in accordance with some aspects of the disclosure.

FIG. 7B is a hardware illustration of a butterfly multiplier with modulo circuit 710 associated with an NTT to solve a butterfly multiplication in accordance with some aspects of the disclosure. The modulo circuit 710 includes a modulo precompute circuit 712 that computes the modulo values and provides the modulo values to a partial multiplier 714. For example, the partial multiplier 714 may be a portion of the butterfly multiplier circuit 610 in FIG. 6B that generates the partial products. The partial products from the partial multiplier 714 are provided to logic 716 for synthesizing the results of the multiplication. That is, the modulo circuit 710 includes a modulo integrated into a Booth-Radix 4 multiplier.

Figure 8A:
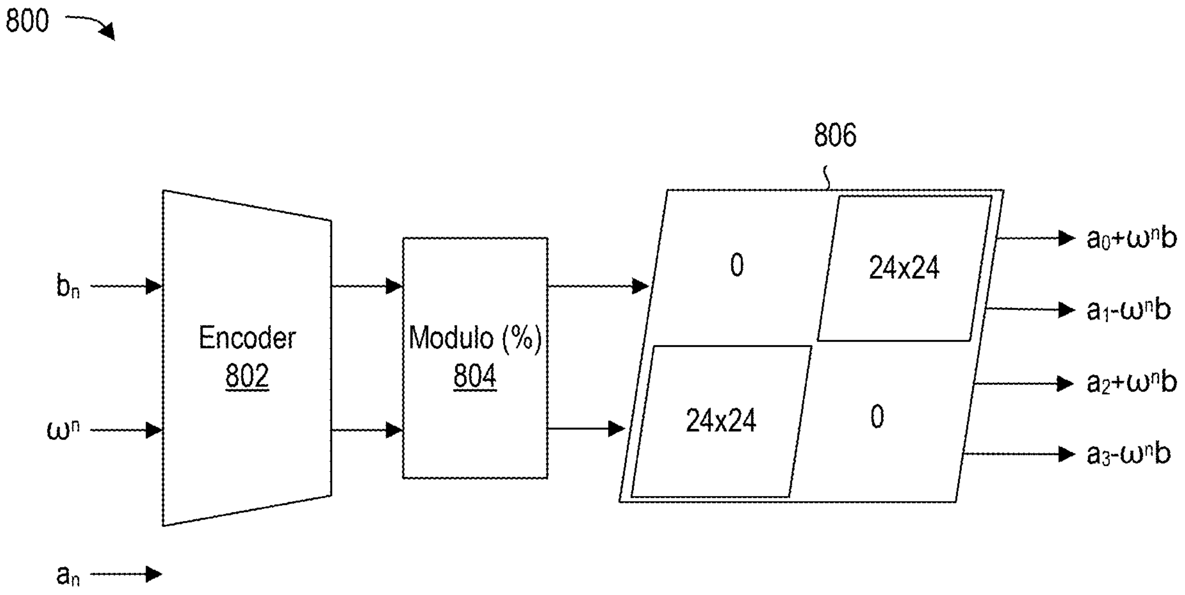
FIG. 8A is a system illustration of a multiply accumulate (MAC) butterfly multiplier circuit configured to solve modulo-based multiplications in parallel, in accordance with some aspects of the disclosure.

FIG. 8A is a system illustration of a butterfly MAC circuit 800 that is configured to solve modulo-based multiplications in parallel. The butterfly MAC circuit 800 includes an encoder 802 and a modulo 804 (where modulo can also be denoted as %) for generating partial products. In this example, the encoder 802 and the modulo 804 are configured to generate partial products for multiple butterfly operations (e.g., coefficients $a_0$-$a_3$) in parallel. The butterfly MAC circuit 800 includes a MAC unit 806 to solve the partial products in parallel. In some aspects, the MAC unit 806 is a hardware component that multiplies the input values to generate a product and adds the products to an accumulated value stored in a register. In this case, the MAC unit 806 solves the multiple coefficients in parallel.

Figure 8B:
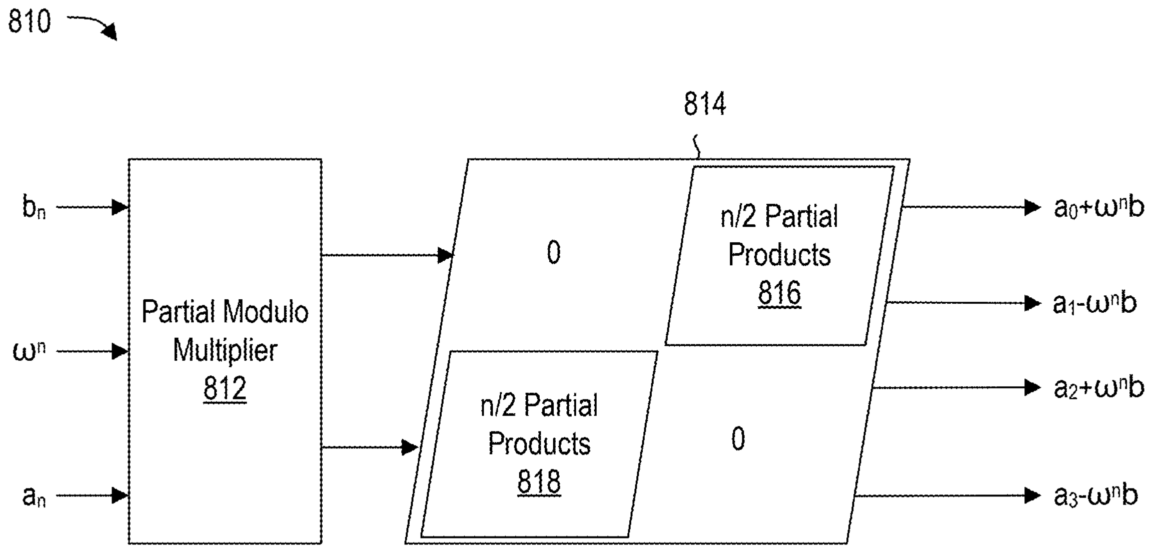
FIG. 8B is a hardware illustration of a butterfly MAC circuit, in accordance with some aspects of the disclosure.

FIG. 8B is a hardware illustration of a butterfly MAC circuit 810 in accordance with some aspects of the disclosure. The butterfly MAC circuit 810 includes a partial modulo multiplier 812 and a MAC unit 814. For example, the butterfly MAC circuit 810 may include the modulo precompute circuit 712 and the partial multiplier 714 of FIG. 7B. The partial modulo multiplier 812 generates and provides the partial products for the multiplication of multiple butterfly operations (e.g., coefficients $a_0$-$a_3$) in parallel. The MAC unit 814 receives the n/2 partial products 816 for first coefficients $a_0$ and $a_1$ and n/2 partial products 818 for first coefficients $a_2$ and $a_3$. The MAC unit solves the partial products 816 and 818 in parallel to generate corresponding outputs.

In some aspects, the butterfly MAC circuit 810 may be implemented as a multiplier circuit in the shared stage multiplier (e.g., as the multiplier circuit 504 in FIG. 5). In one aspect, the butterfly MAC circuit 810 solves multiple butterfly multiplications associated with two butterfly multiplications in parallel using a MAC unit. In this case, by implementing the multiplier circuit to share hardware and introducing the modulo inside the multiplier, the circuitry needed to implement NTT-based operations can be reduced, which reduces the area consumed of a hardware design. For example, introducing the modulo inside a Booth-Radix 4 reduces area by 50%. Reducing the size of a circuit has significant benefits such as reducing power consumption, reducing costs, increasing yield rate, and reducing size.

In addition, the NTT-based operations are conducted faster. For example, an NTT computation can consume thousands of clock cycles per iteration due to load and store operations between multiplication operations. The butterfly MAC circuit 810 parallelizes the operations using the same hardware and does not need to continually load/store between registers, reducing the number of operations. In addition, MAC units are tuned for speed based on breaking down complex mathematical operations in parallel. For example, an NTT operation in Dilithium (M4 version) consumes 8,540 clock cycles using chained butterfly multipliers with three different stages. The butterfly MAC circuit 810 requires 192 cycles for an NTT operation and reduces the number of clock cycles by 97.7%.

In some aspects, a shared stage multiplier (e.g., the shared stage multiplier 500 of FIG. 5) including the butterfly MAC circuit 810 is optimized for NTT-based operations and can increase the speed of other PQC techniques (e.g., Kyber, etc.). The disclosed shared stage multiplier addresses a bottleneck in software implementation and improves the speed of various PQC encryption and encapsulation techniques. In some aspects, the shared stage multiplier can be implemented at a standalone IP (e.g., a very large system integration (VLSI) design) and incorporated into other circuits, such as a wireless communication transceiver, a processor, a trusted platform module (TPM) or other trusted execution environment (TEE), and so forth.

Figure 9:
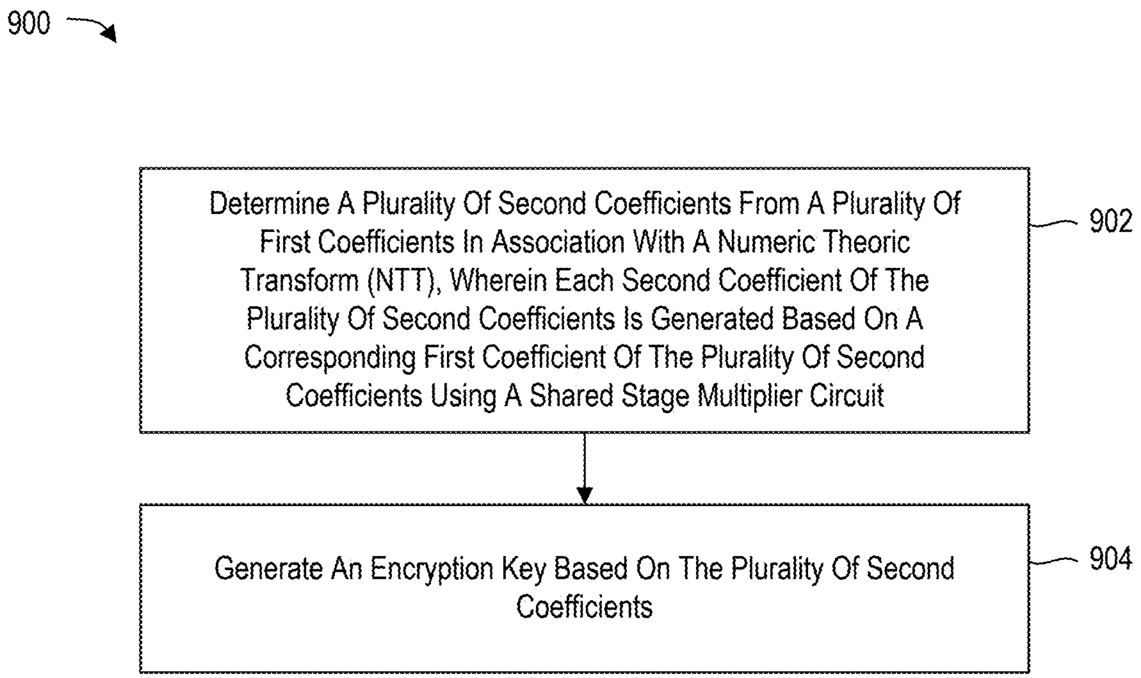
FIG. 9 is a flow diagram illustrating an example NTT computation process for generating point-wise multiplication coefficients using a butterfly MAC circuit, in accordance with some aspects of the disclosure.

FIG. 9 is a flow diagram illustrating an example NTT computation process for generating point-wise multiplication coefficients using a butterfly MAC circuit in accordance with some aspects of the disclosure. The process 900 can be performed by a hardware device (or apparatus) or a component (e.g., one or more chipsets, a system-on-chip (SoC) of one or more processors or modules such as one or more central processing units (CPUs), graphics processing units (GPUs), digital signal processors (DSPs), neural processing units (NPUs), neural signal processors (NSPs), microcontrollers, ASICs, FPGAs, programmable logic devices, discrete gates or transistor logic components, discrete hardware components, etc., a machine learning (ML) system such as a neural network model, any combination thereof, and/or other component or system) of the computing device. The operations of the process 900 may be implemented as hardware components that are executed based on software instructions run on one or more processors (e.g., CPU, GPU, DSP, NPU or neural engine, SoC, the processor 1010 of FIG. 10, and/or other processor(s)).

In some aspects, the hardware device may receive a group key that includes various information for generating a group communications. In one aspect, the group key may include hardware information that refers to value stored within the computing device (e.g., bits encoded into a root of trust or some other integrated circuit or module). For example, the hardware information may be a reference value that refers to a symmetric encryption key that each device associated with other peer devices may also be manufactured with.

At block 902, the hardware device may determine a plurality of second coefficients from a plurality of first coefficients in association with a Numeric Theoric Transform (NTT). In some aspects, each second coefficient of the plurality of second coefficients is generated based on a corresponding first coefficient of the plurality of first coefficients using a shared stage multiplier circuit.

In some aspects, the hardware device may include a shared stage multiplier. The shared stage multiplier may be a single MAC circuit (e.g., a butterfly MAC circuit). The shared stage multiplier may generate a first value based on a first coefficient, generating a second value based on the first value, and generating the plurality of second coefficients based on the second value.

In some aspects, the hardware device may generate interim values based on the plurality of first coefficients using the shared stage multiplier circuit, feed the interim values back into the shared stage multiplier circuit based on computation stages, and output the plurality of second coefficients when a last stage of the computation stages is reached. To generate the interim values, the hardware device may generate first values based on encoding and perform a modulo operation on input values into the shared stage multiplier circuit, and multiply the first values using a MAC circuit. In some aspects, the second coefficients may have a symmetry property that allows for a reduction in the number of coefficients needed to compute the full transform. For example, only the first N/2 coefficients need to be computed, as the remaining coefficients can be derived by mirroring and taking the conjugates of the first half.

At block 904, the hardware device may generate an encryption key based on the plurality of second coefficients.

In some aspects, the hardware device can be used to encrypt content using PQC. For example, the hardware device may encrypt content in a message based on the encryption key. In another example, the hardware device may generate an encrypted signature to include in a message based on the encryption key.

In some aspects, the hardware device can be used to decrypt or validate content using PQC. For example, the hardware device may decrypt content in a message based on the encryption key. In another example, the hardware device may validate a signature in a message based on the encryption key.

In some cases, the hardware device of process 900 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the hardware device of process 900 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 900 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
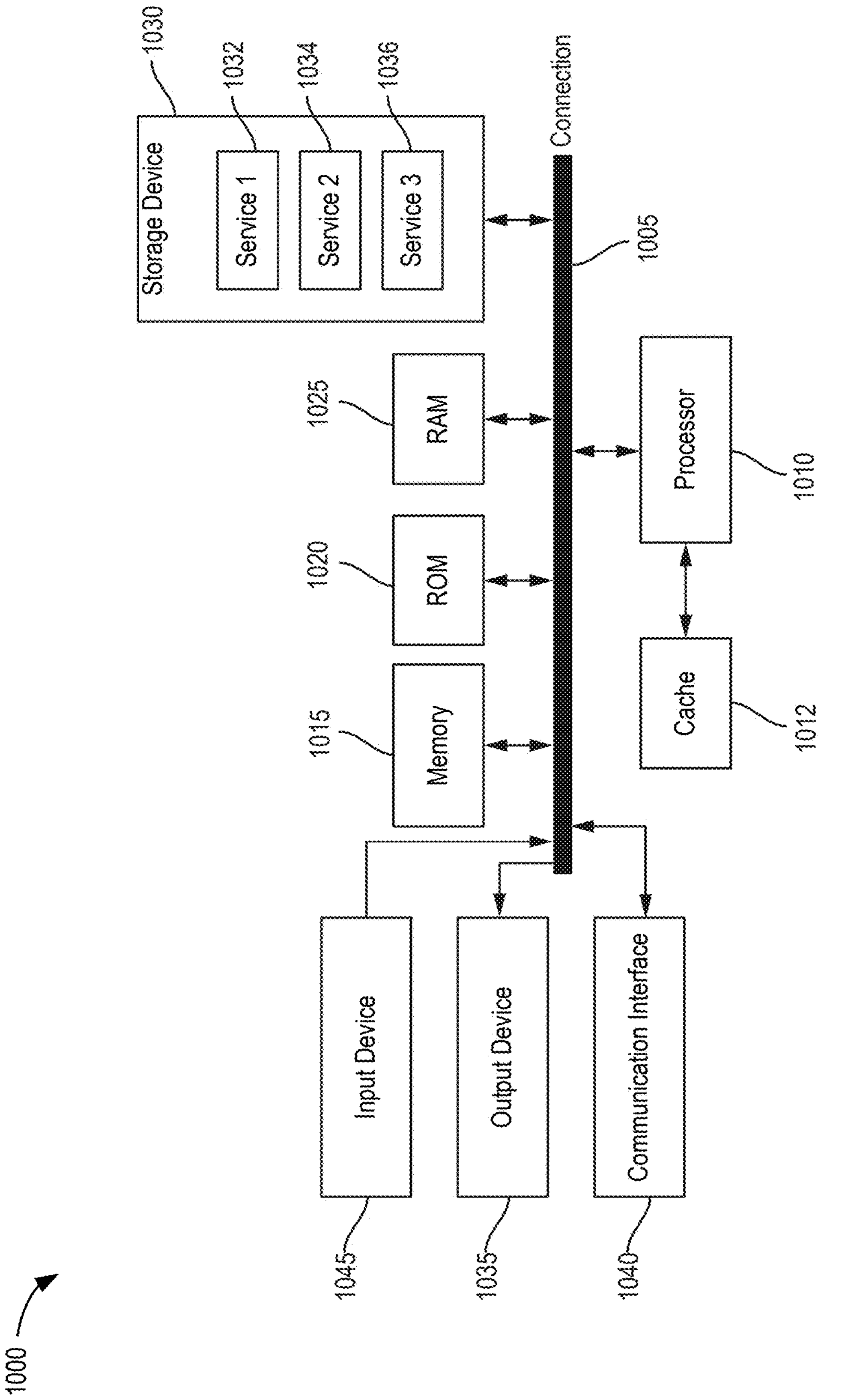
FIG. 10 is a diagram illustrating an example of a system for implementing certain aspects described herein.

FIG. 10 is a block diagram illustrating an example of a computing system 1000, which may be employed for countermeasures against fault attacks on PQC schemes (e.g., digital signature schemes). In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000.

Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1040 may also include one or more range sensors (e.g., LiDAR sensors, laser range finders, RF radars, ultrasonic sensors, and infrared (IR) sensors) configured to collect data and provide measurements to processor 1010, whereby processor 1010 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. For example, concurrent operation involves multiple tasks being performed independently over time and not necessarily simultaneously, while parallel operations involves multiple tasks executing simultaneously, such as on multiple processors or cores. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the present disclosure include:

Aspect 1. A hardware device for performing a PQC function. The hardware device includes a butterfly MAC circuit for calculating output coefficients based on input coefficients and a polynomial value; and a multiplexer for selecting the input coefficients and the polynomial value to input into the butterfly MAC circuit based on a computation stage of an NTT computation, wherein the butterfly MAC circuit is configured to output point-wise coefficients for the NTT computation based on the computation stage.

Aspect 2. The hardware device of Aspect 1, further comprising a modulo precompute circuit configured to generate a modulo associated with the polynomial value; a partial multiplier configured to generate partial products of the modulo and a first input value; and a MAC circuit configured to solve the partial products.

Aspect 3. The hardware device of any of Aspects 1 to 2, wherein the NTT computation includes a first stage, a second stage, and a third stage; and the butterfly MAC circuit is configured to output the point-wise coefficients at the third stage.

Aspect 4. The hardware device of Aspect 3, wherein the multiplexer is configured to input coefficients generated by the butterfly MAC circuit during the first stage to the butterfly MAC circuit during the second stage.

Aspect 5. The hardware device of any of Aspects 3 to 4, wherein the multiplexer is configured to input coefficients generated by the butterfly MAC circuit during the second stage to the butterfly MAC circuit during the third stage.

Aspect 6. The hardware device of any of Aspects 3 to 5, wherein the polynomial value comprises a plurality of polynomial values and the multiplexer is configured to select a corresponding polynomial value of the plurality of polynomial values at each of the first stage, the second stage, and the third stage.

Aspect 7. The hardware device of any of Aspects 1 to 6, wherein the butterfly MAC circuit is configured to concurrently compute two pairs of point-wise coefficients.

Aspect 8. The hardware device of any of Aspects 1 to 7, further comprising: a first delay disposed between the multiplexer and the butterfly MAC circuit; and a second delay disposed between a feedback loop from the butterfly MAC circuit and the multiplexer.

Aspect 9. The hardware device of any of Aspects 1 to 8, wherein the butterfly MAC circuit is configured to generate partial products corresponding to a Booth Radix 4 scheme and solve the partial products.

Aspect 10. The hardware device of any of Aspects 1 to 9, wherein the hardware device is configured to generate an encryption key or a decryption key based on the point-wise coefficients.

Aspect 11. A method of performing a post quantum cryptography function, comprising: determining a plurality of second coefficients from a plurality of first coefficients in association with a Numeric Theoric Transform (NTT), wherein each second coefficient of the plurality of second coefficients is generated based on a corresponding first coefficient of the plurality of second coefficients using a shared stage multiplier circuit; and generating an encryption key based on the plurality of second coefficients.

Aspect 12. The method of Aspect 11, further comprising: encrypting content in a message based on the encryption key.

Aspect 13. The method of any of Aspects 11 to 12, further comprising: generating an encrypted signature to include in a message based on the encryption key.

Aspect 14. The method of any of Aspects 11 to 13, further comprising: decrypting content in a message based on the encryption key.

Aspect 15. The method of any of Aspects 11 to 14, further comprising: validating a signature in a message based on the encryption key.

Aspect 16. The method of any of Aspects 11 to 15, further comprising: performing a point-wise multiplication based on the plurality of second coefficients.

Aspect 17. The method of any of Aspects 11 to 16, wherein determining the plurality of second coefficients comprises: generating a first value based on a first coefficient using the shared stage multiplier circuit; generating a second value based on the first value using the shared stage multiplier circuit; and generating the plurality of second coefficients based on the second value using the shared stage multiplier circuit.

Aspect 18. The method of any of Aspects 11 to 17, further comprising: generating interim values based on the plurality of first coefficients using the shared stage multiplier circuit; feeding the interim values back into the shared stage multiplier circuit based on an iteration count; and outputting the plurality of second coefficients when the iteration count is reached.

Aspect 19. The method of Aspect 18, wherein the generating of the interim values comprises: generating first values based on encoding and performing a modulo operation on input values into the shared stage multiplier circuit; and multiplying the first values using a MAC circuit.

Aspect 20. The method of any of Aspects 11 to 19, further comprising: joining mirrored second coefficients into the plurality of second coefficients based on a symmetry.

Aspect 21. The method of any of Aspects 11 to 20, wherein the shared stage multiplier circuit includes a single multiply-accumulate circuit.

Aspect 22. An apparatus for performing a PQC function, comprising one or more means for performing operations according to any of Aspects 11 to 21.

Aspect 23. A non-transitory computer-readable medium having stored thereon instructions that, when executed by at least one processor, cause the at least one processor to perform operations according to any of Aspects 11 to 21.

What is claimed is:

1. An apparatus for Number Theoric Transform (NTT) computations, the apparatus comprising:

a butterfly multiply-accumulate (MAC) circuit for calculating output coefficients based on input coefficients and a polynomial value; and a multiplexer for selecting the input coefficients and the polynomial value to input into the butterfly MAC circuit based on a computation stage of an NTT computation, wherein the butterfly MAC circuit is configured to output point-wise coefficients for the NTT computation based on the computation stage.

2. The apparatus of claim 1, wherein the butterfly MAC circuit comprises:

a modulo precompute circuit configured to generate a modulo associated with the polynomial value;

a partial multiplier configured to generate partial products of the modulo and a first input value; and a MAC circuit configured to solve the partial products.

3. The apparatus of claim 1, wherein:

the NTT computation includes a first stage, a second stage, and a third stage; and the butterfly MAC circuit is configured to output the point-wise coefficients at the third stage.

4. The apparatus of claim 3, wherein the multiplexer is configured to input coefficients generated by the butterfly MAC circuit during the first stage to the butterfly MAC circuit during the second stage.

5. The apparatus of claim 3, wherein the multiplexer is configured to input coefficients generated by the butterfly MAC circuit during the second stage to the butterfly MAC circuit during the third stage.

6. The apparatus of claim 3, wherein the polynomial value comprises a plurality of polynomial values and the multiplexer is configured to select a corresponding polynomial value of the plurality of polynomial values at each of the first stage, the second stage, and the third stage.

7. The apparatus of claim 1, wherein the butterfly MAC circuit is configured to concurrently compute two pairs of point-wise coefficients.

8. The apparatus of claim 1, further comprising:

a first delay disposed between the multiplexer and the butterfly MAC circuit; and a second delay disposed between a feedback loop from the butterfly MAC circuit and the multiplexer.

9. The apparatus of claim 1, wherein the butterfly MAC circuit is configured to generate partial products corresponding to a Booth Radix 4 scheme and solve the partial products.

10. The apparatus of claim 1, further comprising:

a processor configured to generate an encryption key or a decryption key based on the point-wise coefficients.

11. A method of performing a post quantum cryptography function, comprising:

determining a plurality of second coefficients from a plurality of first coefficients in association with a Numeric Theoric Transform (NTT), wherein each second coefficient of the plurality of second coefficients is generated based on a corresponding first coefficient of the plurality of first coefficients using a shared stage multiplier circuit; and generating an encryption key based on the plurality of second coefficients.

12. The method of claim 11, further comprising:

encrypting content in a message based on the encryption key.

13. The method of claim 11, further comprising:

generating an encrypted signature to include in a message based on the encryption key.

14. The method of claim 11, further comprising:

decrypting content in a message based on the encryption key.

15. The method of claim 11, further comprising:
validating a signature in a message based on the encryption key.

16. The method of claim 11, further comprising:
performing a point-wise multiplication based on the plurality of second coefficients.

17. The method of claim 11, wherein determining the plurality of second coefficients comprises:
generating a first value based on a first coefficient using the shared stage multiplier circuit;
generating a second value based on the first value using the shared stage multiplier circuit; and
generating the plurality of second coefficients based on the second value using the shared stage multiplier circuit.

18. The method of claim 11, further comprising:
generating interim values based on the plurality of first coefficients using the shared stage multiplier circuit;
feeding the interim values back into the shared stage multiplier circuit based on computation stages; and
outputting the plurality of second coefficients when a last stage of the computation stages is reached.

19. The method of claim 18, wherein the generating of the interim values comprises:
generating first values based on encoding and performing a modulo operation on input values into the shared stage multiplier circuit; and
multiplying the first values using a MAC circuit.

20. The method of claim 11, further comprising:
joining mirrored second coefficients into the plurality of second coefficients based on a symmetry.

* * * * *